United States Patent
Watanabe et al.

(10) Patent No.: US 9,534,815 B2
(45) Date of Patent: Jan. 3, 2017

(54) MAGNETIC HEAT PUMP WITH AGITATING STRUCTURE AND ADDITIVES FOR HEAT TRANSFER MEDIUM

(75) Inventors: Naoki Watanabe, Kariya (JP); Kazutoshi Nishizawa, Toyoake (JP); Shinichi Yatsuzuka, Nagoya (JP); Tsuyoshi Morimoto, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 576 days.

(21) Appl. No.: 13/455,432

(22) Filed: Apr. 25, 2012

(65) Prior Publication Data

US 2012/0272666 A1    Nov. 1, 2012

(30) Foreign Application Priority Data

Apr. 28, 2011  (JP) ................................ 2011-102067
Dec. 15, 2011  (JP) ................................ 2011-274527

(51) Int. Cl.
*F25B 21/00*   (2006.01)
*F25B 25/00*   (2006.01)
*B60H 1/32*    (2006.01)

(52) U.S. Cl.
CPC ............... *F25B 21/00* (2013.01); *B60H 1/32* (2013.01); *F25B 25/005* (2013.01); *F25B 2321/0022* (2013.01); *Y02B 30/66* (2013.01)

(58) Field of Classification Search
CPC ... F25B 2321/002; F25B 21/00; F25B 47/022; F25B 13/00; F25B 41/04; F25B 2321/0022; F25B 25/005; B60H 1/32; F01M 5/007; F28F 27/02; Y02B 30/66

USPC ...................................................... 62/3.1, 467
See application file for complete search history.

(56) References Cited

U.S. PATENT DOCUMENTS

| | | | | |
|---|---|---|---|---|
| 4,080,663 A | * | 3/1978 | Wik ................... | B01F 13/0818 366/274 |
| 4,489,742 A | * | 12/1984 | Moore et al. ............... | 136/203 |
| 7,357,567 B2 | * | 4/2008 | Terentiev ............ | B01F 13/0818 366/273 |

(Continued)

FOREIGN PATENT DOCUMENTS

| | | |
|---|---|---|
| CN | 101336356 | 12/2008 |
| JP | 2006-240501 | 9/2006 |

(Continued)

OTHER PUBLICATIONS

Machine translation of JP2007-150199A (Osawa).*

(Continued)

*Primary Examiner* — Len Tran
*Assistant Examiner* — Gordon Jones
(74) *Attorney, Agent, or Firm* — Harness, Dickey & Pierce, P.L.C.

(57) ABSTRACT

In a magnetic heat pump system, in which heat transport medium is heated or cooled by magnetocaloric effect material accommodated in a magnetic heat pump device. A material having a coefficient of thermal conductivity, which is higher than that of the heat transport medium, or a material having a specific heat or a volume specific heat, which is higher than that of the heat transport medium, is mixed in the heat transport medium. A coefficient of thermal conductivity of the heat transport medium is thereby increased so as to increase heating and/or cooling performance of the magnetic heat pump system.

9 Claims, 9 Drawing Sheets

(56) References Cited

U.S. PATENT DOCUMENTS

| | | | |
|---|---|---|---|
| 7,644,588 | B2 | 1/2010 | Shin et al. |
| 7,748,893 | B2 * | 7/2010 | Yaniv .................. B01F 13/0827 366/273 |
| 8,230,901 | B2 | 7/2012 | Osawa |
| 2005/0274454 | A1 * | 12/2005 | Extrand ..................... 156/272.4 |
| 2006/0080979 | A1 | 4/2006 | Kitanovski |
| 2007/0130960 | A1 | 6/2007 | Muller et al. |
| 2008/0314049 | A1 | 12/2008 | Shin et al. |
| 2009/0217675 | A1 * | 9/2009 | Kobayashi et al. ............. 62/3.1 |
| 2012/0032105 | A1 | 2/2012 | Seeler et al. |

FOREIGN PATENT DOCUMENTS

| | | |
|---|---|---|
| JP | 2007-150199 | 6/2007 |
| JP | 4387892 | 10/2009 |
| JP | 2010-112606 | 5/2010 |
| JP | 2008-112874 | 5/2015 |
| WO | WO2010-115791 | 10/2010 |

OTHER PUBLICATIONS

Machine translation of JP 2008-112874A (Uchida et al.).*
Author: Sari et al.; Title: Polymer-stearic acid blends as form-stable phase change material for thermal energy storage; Journal of Scientific & Industrial Research vol. 64, Dec. 2005, pp. 991-996.*
NIST Octadecanoic acid data sheet.*
NIST 1_2_Ethanediol data sheet.*
Office action dated Aug. 20, 2014 in corresponding Chinese No. 201210120871.8.
Office Action dated Jun. 13, 2012 in corresponding FR application No. 1201182 with English translation thereof.
Office action dated Apr. 9, 2013 in corresponding Japanese Application No. 2011-274527.
Search Report mailed Dec. 10, 2015 in the corresponding French Application No. 1201182 with English.

* cited by examiner

MAGNETIC HEAT PUMP WITH AGITATING STRUCTURE AND ADDITIVES FOR HEAT TRANSFER MEDIUM

CROSS REFERENCE TO RELATED APPLICATION

This application is based on Japanese Patent Applications No. 2011-102067 filed on Apr. 28, 2011 and No. 2011-274527 filed on Dec. 15, 2011, the disclosures of which are incorporated herein by reference.

TECHNICAL FIELD

The present disclosure relates to a magnetic heat pump system and an air conditioning apparatus having the same.

According to the present disclosure, heat transport medium is used in the magnetic heat pump system, wherein such material as having a coefficient of thermal conductivity, or such material as having a specific heat or a volume specific heat, higher than that of the heat transport medium is mixed in the heat transport medium. With such heat transport medium, the magnetic heat pump system and the air conditioning apparatus having the same are provided, according to which cooling capacity as well as heating capacity is increased.

BACKGROUND

A magnetic heat pump system is known in the art, for example, as disclosed in Japanese Patent No. 4387892, as a heat pump system of an air conditioning apparatus for a vehicle, for example, an air conditioning apparatus for a motor vehicle or a railroad vehicle. In the magnetic heat pump system, a certain kind of magnetic material (which is referred to as "magnetic working material" in the above Japanese Patent, but referred to as "magnetocaloric effect material" in this disclosure) is used. When magnetic field is applied to the magnetocaloric effect material, heat is generated in the magnetocaloric effect material, while when the magnetic field is removed, temperature thereof is decreased (this phenomenon is called as "magnetocaloric effect").

When compared with a gas heat pump system, since chlorofluorocarbon or alternatives for chlorofluorocarbon is not used for the magnetic heat pump system, it is environmentally friendly. In addition, since a compression stroke and an expansion stroke, which are necessary for the gas heat pump system using a compressor, are not required for the magnetic heat pump system, energy efficiency is high. Components, which are necessary for the magnetic heat pump system, are (i) a pump for moving heat transport medium so that it passes through magnetocaloric effect material in order to carry out heat exchange therewith and (ii) a magnetic field changing device for changing magnetic field to be applied to the magnetocaloric effect material.

In a conventional magnetic heat pump system or in a conventional air conditioning apparatus having the magnetic heat pump system, water or anti-freeze liquid (LLC: a long life coolant) is used as heat transport medium, which passes through the magnetocaloric effect material so that heat exchange is carried out between the heat transport medium and the magnetocaloric effect material. The water or the anti-freeze liquid is generally used as heat transporting medium but heat-exchange performance is not high.

Therefore, in a case that a cooling performance will be increased for the magnetic heat pump system, in which the water or the anti-freeze liquid is used, it is necessary to make the magnetic heat pump system larger in its size. It is, then, a disadvantage that weight of the magnetic heat pump system will be increased.

SUMMARY OF THE DISCLOSURE

The present disclosure is made in view of the above points. It is an object of the present disclosure to provide a magnetic heat pump system and/or an air conditioning apparatus having the magnetic heat pump system, according to which heat transport medium having a high coefficient of thermal conductivity is used so that heat exchange between the heat transport medium and magnetocaloric effect material can be effectively carried out. As a result, the cooling performance can be increased without making the magnetic heat pump system larger in its size.

According to a feature of the present disclosure (for example, as defined in the appended claim 1), a magnetic heat pump system has;

a magnetic heat pump device;

a heat radiating device for radiating heat of the heat transport medium discharged from the one end of the container to an outside of the heat radiating device; and a heat absorbing device for absorbing heat from an outside of the heat absorbing device into the heat transport medium discharged from the other end of the container.

The magnetic heat pump device has;

a container in which magnetocaloric effect material is accommodated and through which heat transport medium passes;

a magnetic field changing unit for changing degree of magnetic field to be applied to the magnetocaloric effect material; and a working fluid moving unit for moving the heat transport medium in a reciprocating manner in the container, so that the heat transport medium is sucked into the container through one end of the container and the heat transport medium is discharged from the container through the other end of the container and vice versa.

And in the above magnetic heat pump system, one of the following first and second materials is mixed in the heat transport medium;

first material having a coefficient of thermal conductivity, which is higher than that of the heat transport medium, and second material having a specific heat or a volume specific heat, which is higher than that of the heat transport medium.

According to the above feature, the coefficient for the thermal conductivity is increased and thereby heat exchange between the magnetocaloric effect material and the heat transport medium can be effectively (at a high speed) carried out.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
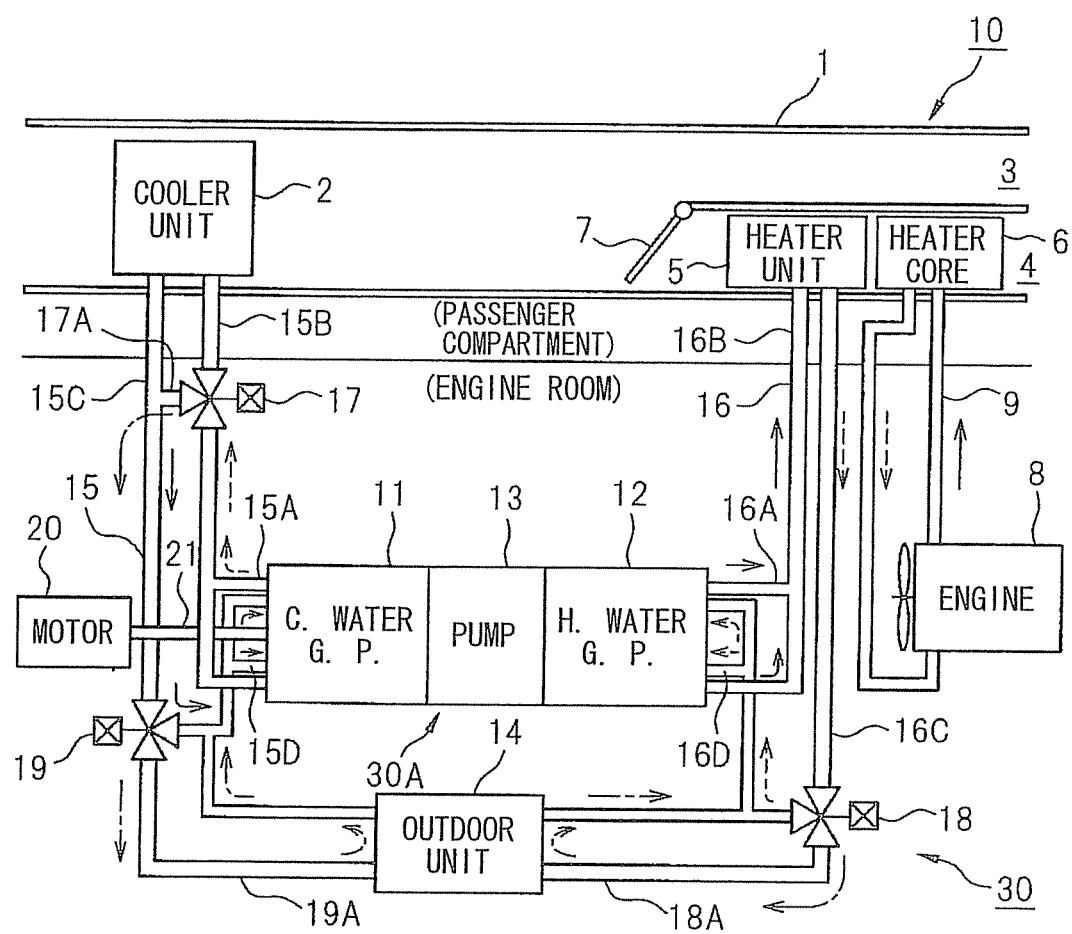
FIG. 1 is a schematic view showing an entire structure of an air conditioning apparatus for a vehicle having a magnetic heat pump system according to a first embodiment of the present disclosure.

The present disclosure will be explained by way of multiple embodiments with reference to the drawings. The same reference numerals are used throughout the embodiments for the purpose of designating the same or similar parts and/or components.

First Embodiment

FIG. 1 shows a structure of an air conditioning apparatus 10 for a vehicle, to which a magnetic heat pump system 30 according to the present embodiment is applied. Some components of the air conditioning apparatus 10 are mounted in a passenger compartment side of the vehicle. A cooler unit 2 (a heat absorbing device) is provided in a main body housing 1 of the apparatus 10. A cold air passage 3 and a hot air passage 4 are formed in the housing 1 at a downstream side of the cooler unit 2, wherein a heater unit 5 (a heat radiating device) and a heater core 6 are provided in the hot air passage 4 for radiating heat from heat transport medium to an outside thereof. An air-mix door 7 is provided at upstream ends of the cold air passage 3 and the hot air passage 4 so as to control flow of cold air having passed through the cooler unit 2. As a result, the cold air is controlled to flow through either the cold air passage 3 or the hot air passage 4.

A magnetic heat pump device 30A of the magnetic heat pump system 30, which is composed of a cold water generating portion 11, a hot water generating portion 12 and a reciprocating pump 13 (a working fluid moving device for moving the heat transport medium), is arranged in an engine room of the vehicle. The magnetic heat pump device 30A is operated by a motor 20 via a rotational shaft 21. As explained below, the reciprocating pump 13 moves the heat transport medium in a reciprocating manner. More detailed inside structure of the magnetic heat pump device 30A will be explained below.

The cold water generating portion 11 cools down the heat transport medium by magnetic action. The heat transport medium, which is cooled down by the cold water generating portion 11, is discharged by the reciprocating pump 13 into a cold water circulation pipe 15 (a first circulation pipe) and supplied to the cooler unit 2. The heat transport medium is then returned to the cold water generating portion 11.

The hot water generating portion 12 heats up the heat transport medium by the magnetic action. The heat transport medium, which is heated by the hot water generating portion 12, is discharged by the reciprocating pump 13 into a hot water circulation pipe 16 (a second circulation pipe) and supplied to the heater unit 5. The heat transport medium is then returned to the hot water generating portion 12.

According to the air conditioning apparatus 10, engine cooling water, which has cooled down an internal combustion engine 8, is supplied to the heater core 6 provided in the hot air passage 4 via a hot water circuit 9, so that the air passing through the hot air passage 4 is heated by not only the heater unit 5 but also the heater core 6.

A structure for the cold water circulation passage 15 as well as a structure for the hot water circulation passage 16 will be explained. The cold water generating portion 11 has multiple cylinders, to each of which a branch-out pipe 15A is connected. The multiple branch-out pipes 15A are collected at a supply pipe 15B, so that the heat transport medium is supplied to the cooler unit 2. The heat transport medium discharged from the cooler unit 2 flows to the cold water generating portion 11 via a return pipe 15C and finally supplied (distributed) into the respective cylinders via respective branch-out pipes 15D, each of which is connected to the respective cylinders.

A bypass pipe 17A (a first bypass passage) is provided between the supply pipe 15B and the return pipe 15C, so that a fluid passage (for the heat transport medium) bypasses the cooler unit 2. One end of the bypass pipe 17A is directly connected to the return pipe 15C, while the other end of the bypass pipe 17A is connected to the supply pipe 15B via a first switching valve 17.

In a heating operation of the air conditioning apparatus 10, the flow of the heat transport medium in the supply pipe 15B to the cooler unit 2 is blocked by the first switching valve 17, so that the heat transport medium is returned to the cold water generating portion 11 via the bypass pipe 17A. In addition, a third switching valve 19 is provided in the return pipe 15C at an upstream side of the branch-out pipes 15D. A bypass pipe 19A (a third bypass passage) is connected to the third switching valve 19, so that the heat transport medium may be returned to the branch-out pipes 15D via an outdoor unit 14.

Therefore, in the heating operation, the heat transport medium in the return pipe 15C flows into the bypass pipe 19A, via the third switching valve 19 so as to absorb heat from outside air in the outdoor unit 14. Then, the heat transport medium flows again into the return pipe 15C and to the branch-out pipes 15D, so that the heat transport medium is finally returned to the cold water generating portion 11.

In a similar manner to the cold water generating portion 11, the hot water generating portion 12 has multiple cylinders for heating the heat transport medium to generate the hot water. Each one end of multiple branch-out pipes 16A is respectively connected to each of the cylinders, while other ends of the branch-out pipes 16A are collected at a supply pipe 16B, so that the heat transport medium is supplied to the heater unit 5. The heat transport medium discharged from the heater unit 5 flows to the hot water generating portion 12 via a return pipe 16C and finally supplied (distributed) into the respective cylinders via respective branch-out pipes 16D, each of which is connected to the respective cylinders.

In addition, a second switching valve 18 is provided in the return pipe 16C at an upstream side of the branch-out pipes 16D. A bypass pipe 18A (a second bypass passage) is connected to the second switching valve 18, so that the heat transport medium may be returned to the branch-out pipes 16D via the outdoor unit 14.

Therefore, the heat transport medium in the return pipe 16C flows into the bypass pipe 18A via the second switching valve 18 depending on a valve position thereof so as to absorb heat from outside air in the outdoor unit 14. Then, the heat transport medium flows again into the return pipe 16C and to the branch-out pipes 16D, so that the heat transport medium is finally returned to the hot water generating portion 12.

Figure 2A:
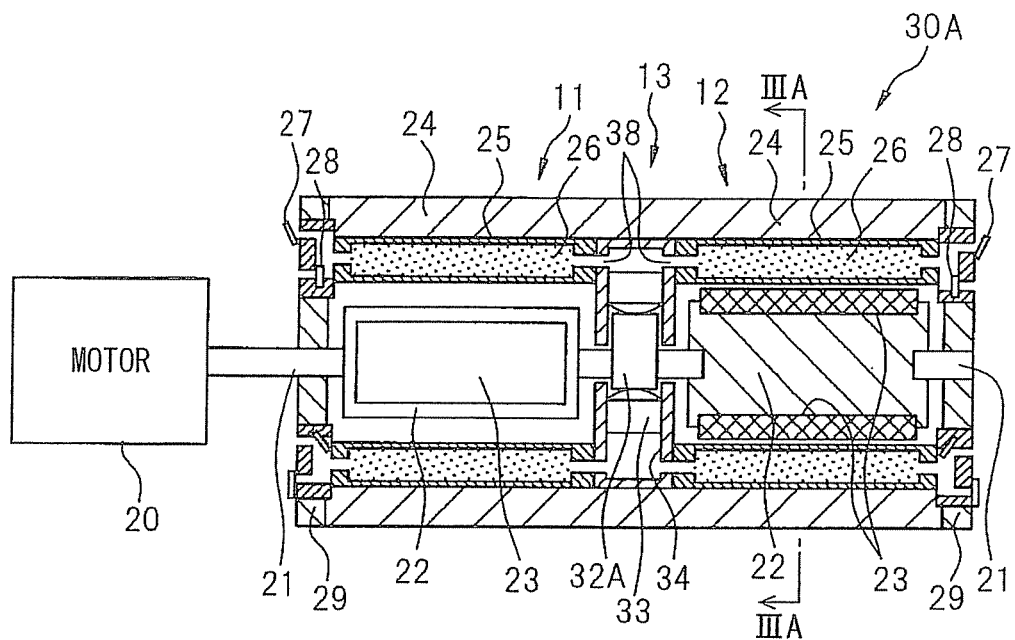
FIG. 2A is a schematic cross sectional view showing a detailed structure of a magnetic heat pump device shown in FIG. 1.
Figure 2B:
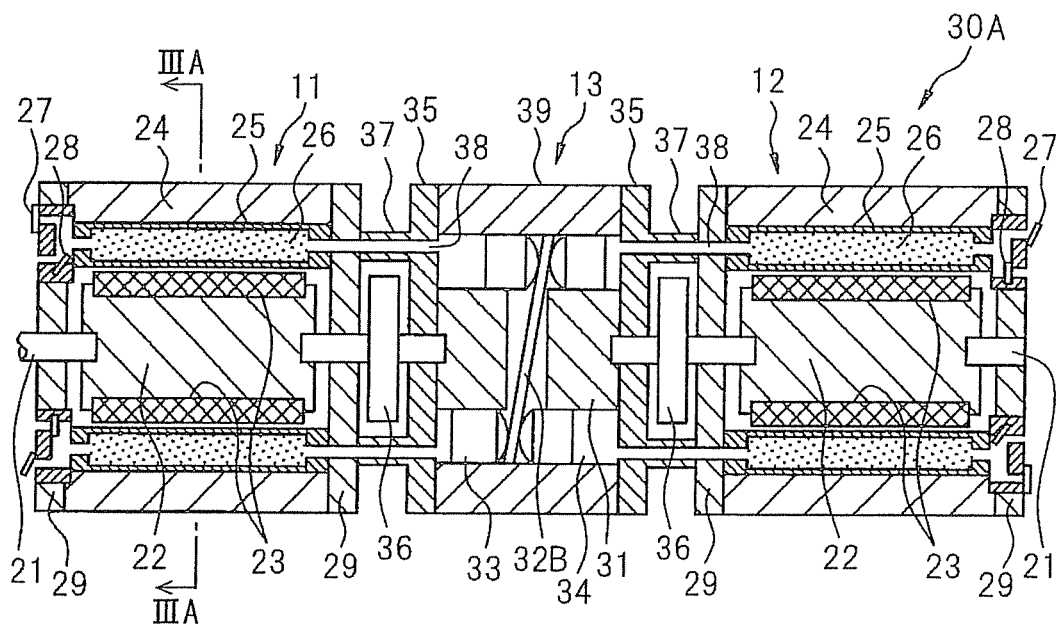
FIG. 2B is a schematic cross sectional view showing another example for the structure of the magnetic heat pump device shown in FIG. 1.

The inside structures of the magnetic heat pump device 30A (the cold water generating portion 11, the hot water generating portion 12 and the reciprocating pump 13) will be explained with reference to FIGS. 2A, 2B and 3A to 3C. FIG. 2A shows an example of the magnetic heat pump device 30A, in which a radial-piston type pump is used as the reciprocating pump 13, while FIG. 2B shows another example of the magnetic heat pump device 30A, in which a swash-plate type compressor is used as the reciprocating pump 13.

The inside structure of the cold water generating portion 11 and the inside structure of the hot water generating portion 12, which are provided at both sides of the reciprocating pump 13, are identical to each other. Therefore, the same reference numerals are given to the same parts and/or portions. The structure of the cold water generating portion 11 will be explained as a representing example, when the radial-piston type pump is used as the reciprocating pump 13.

Figure 3A:
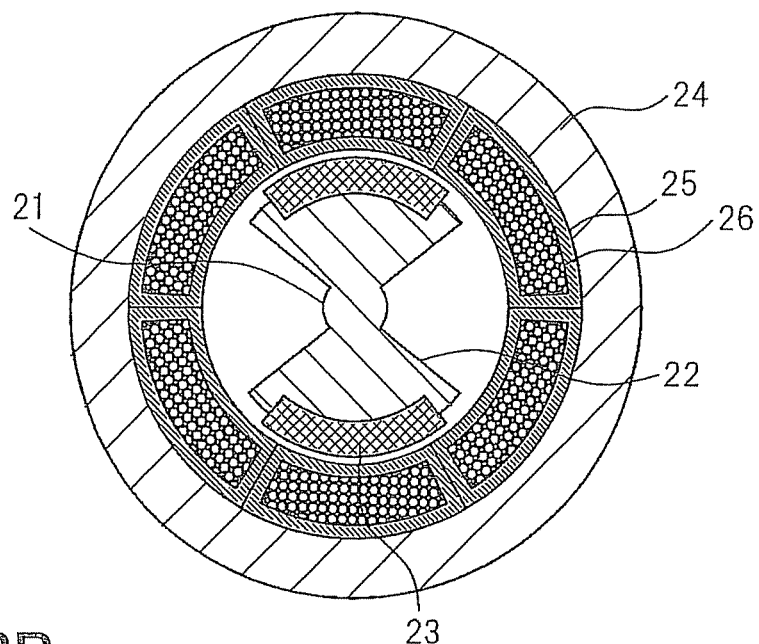
FIG. 3A is a schematic cross sectional view taken along a line IIIA-IIIA in FIG. 2A or FIG. 2B.

The cold water generating portion 11 has a cylindrical yoke 24, which is coaxially arranged with the rotational shaft 21. A rotor 22 has a pair of rotor members, each having a sector form in its cross section, as shown in FIG. 3A or 3C. The rotor members are opposing to each other with respect to the rotational shaft 21. A permanent magnet 23 is provided at an outer peripheral surface of each sector formed rotor member. An outer surface of one magnet 23 is magnetized as N-pole, while an outer surface of the other magnet 23 is magnetized as S-pole.

Multiple (six) containers 25, in which magnetocaloric effect material 26 (having magnetocaloric effect) is filled, are arranged between an outside of a rotational excursion of the magnets 23 and an inside of the yoke 24. The heat transport medium can pass through the containers 25, which are filled with the magnetocaloric effect material.

The multiple containers 25 for the cold water generating portion 11 are collectively referred to as a first container unit, while the multiple containers 25 for the hot water generating portion 12 are collectively referred to as a second container unit.

Figure 3B:
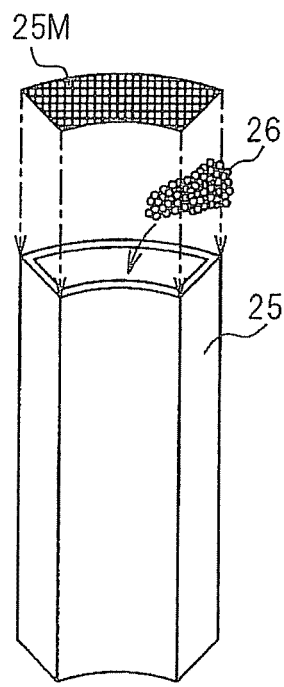
FIG. 3B is a schematic perspective view showing a container for accommodating magnetocaloric effect material.
Figure 3C:
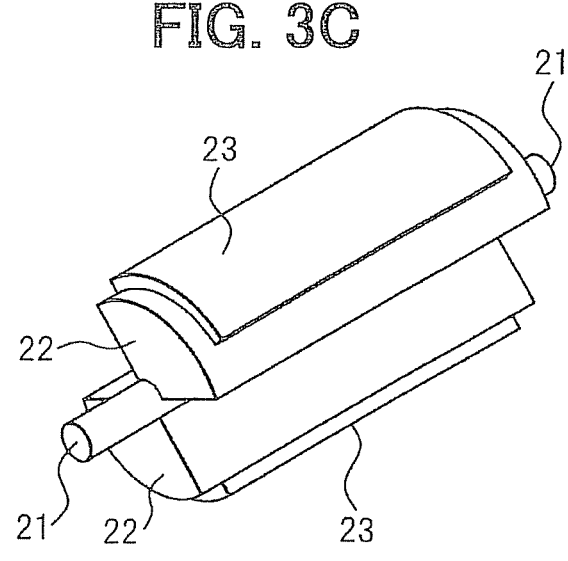
FIG. 3C is a schematic perspective view showing a rotor having permanent magnets.

As shown in FIG. 3B, each of the containers 25 has a hollow sector form in its cross section and pellet type magnetocaloric effect material 26 are filled into an inside space of each container 25. Both axial ends of the container 25 are closed by meshed end plates 25M so that the magnetocaloric effect material 26 is held in the container 25. Working fluid (liquid) flows into the inside of the container 25 through the meshed end plate 25M at one axial end of the container 25, passes through spaces among the magnetocaloric effect material 26, and flows out to the outside through the meshed end plate 25M at the other axial end of the container 25.

According to the present embodiment, the six containers 25, each having the same shape to the other, are arranged at the inside of the cylindrical yoke 24. The permanent magnets 23 fixed to the outer periphery of the rotor 22 are rotated in a space formed by inner peripheral surfaces of the containers 25. The rotor 22, the permanent magnets 23 and the yoke 24 work as a portion for changing magnetic field to be applied to the magnetocaloric effect material 26 filled in the containers 25 (They are collectively referred to as a magnetic-field changing unit).

As shown in FIG. 2A, the reciprocating pump 13 is composed of the radial-piston type pump, wherein a housing for the pump 13 is integrally formed with the cylindrical yoke 24 for the cold water and hot water generating portions 11 and 12. Six cylinders 34 (corresponding to the number of the containers 25) are formed in the radial-piston type pump 13 in a radial pattern with respect to the rotational shaft 21. A reciprocating piston 33 is movably provided in each of the cylinders 34. A control cam member 32A is formed in the rotational shaft 21 to be rotated by the motor 20, wherein the cam member 32A is eccentrically formed with the rotational shaft 21. Each axial inner end of the pistons 33 is in contact with an outer profile of the control cam member 32A. When the control cam member 32A is rotated by one rotation (360 degree rotation), each of the pistons 33 is reciprocated one time in the respective cylinder. A side wall of each cylinder 34, which is located at an axial outer end of the piston 33, that is, at a position remote from the rotational shaft 21, is connected to an axial end of the corresponding containers 25 for the cold water and hot water generating portions 11 and 12 through respective communication passages 38.

According to the present embodiment shown in FIG. 2A, an outside end plate 29 is attached to an axial outer end of the cold water generating portion 11, which is on a side (a left-hand side in the drawing) remote from the radial-piston pump 13. An inlet valve 28 for allowing the heat transport medium to flow into the container 25 and an outlet valve 27 for allowing the heat transport medium to flow out from the container 25 are provided in the outside end plate 29 at such portions to be communicated to the inside space of each container 25.

Each of the branch-out pipes 15A for the supply pipe 15B is connected to the respective outlet valve 27, while each of the branch-out pipes 15D for the return pipe 15C is connected to the respective inlet valve 28. In the case of the radial-piston pump 13, a rotational positional of the permanent magnets 23 with respect to the rotational shaft 21 for the cold water generating portion 11 is displaced from that for the hot water generating portion 12 by 90 degrees.

According to the present embodiment shown in FIG. 2B, which shows another example for the structure of the magnetic heat pump device 30A, the reciprocating pump 13 is composed of the swash-plate type compressor, which is structured as a separate component from the cold water generating portion 11 and the hot water generating portion 12. Six cylinders 34 (corresponding to the number of the containers 25) are formed in the swash-plate type pump 13. A reciprocating piston 33 is movably provided in each of the cylinders 34. An outer peripheral portion of a swash plate 32B, which is attached to a rotary member 31 to be rotated by the motor 20, is operatively engaged with each piston 33. The swash plate 32B is attached to the rotary member 31 in an inclined condition. When the rotary member 31 is rotated, each of the pistons 33 is reciprocated by the swash plate 32B by one time for each revolution of the rotary member 31.

One of axial ends of each cylinder 34 (a left-hand end) is respectively connected to the axial end (the right-hand end) of the corresponding container 25 for the cold water generating portion 11 via a communication passage 38 formed in a connecting pipe 37. In a similar manner, the other axial end of each cylinder 34 (a right-hand end) is respectively connected to the axial end (the left-hand end) of the corresponding container 25 for the hot water generating portion 12 via a communication passage 38 formed in a connecting pipe 37. Reference numerals 36 designate gears.

Referring back to FIG. 2A, in a similar manner to the cold water generating portion 11, an outside end plate 29 is attached to an axial outer end of the hot water generating portion 12, which is on a side (a right-hand side in the drawing) remote from the radial-piston pump 13. An inlet valve 28 and an outlet valve 27 are likewise provided in the outside end plate 29 at such portions to be communicated to the inside space of each container 25. Each of the branch-out pipes 16A for the supply pipe 16B is connected to the respective outlet valve 27, while each of the branch-out pipes 16D for the return pipe 16C is connected to the respective inlet valve 28.

When the pistons 33 of the radial-piston type pump 13 are moved so that the heat transport medium is sucked in the container 25 of the cold water generating portion 11, the heat transport medium is also sucked in the container 25 of the hot water generating portion 12 (corresponding to the container 25 of the cold water generating portion 11). In case of the swash-plate type 13, however, when the heat transport medium is sucked in the container 25 of the cold water generating portion 11, the heat transport medium is pumped out from the container 25 of the hot water generating portion 12 (corresponding to the container 25 of the cold water generating portion 11).

When the heat transport medium is pumped out from the container 25 of the cold water generating portion 11, the magnetic field which has been applied to the magnetocaloric effect material 26 in the container 25 will be removed. Temperature of the magnetocaloric effect material 26 is then decreased and thereby the heat transport medium to be pumped out is cooled down. Such cooled-down heat transport medium is supplied into the cold water circulation pipe 15.

On the other hand, when the heat transport medium is pumped out from the container 25 of the hot water generating portion 12, the magnetic field is applied to the magnetocaloric effect material 26 in the container 25. Then, heat is generated in the magnetocaloric effect material 26 and thereby the heat transport medium to be pumped out is heated up. Such heated-up heat transport medium is supplied into the hot water circulation pipe 16. The permanent magnets 23 are arranged in the rotor 22 so as to carry out the above operation.

According to the above magnetic heat pump system 30 and the air conditioning apparatus 10 having such heat pump system 30, such material having a higher coefficient of thermal conductivity than that of the heat transport medium is mixed in the heat transport medium. The material, which has the higher coefficient of thermal conductivity than that of the heat transport medium, includes, for example, carbon nano-tube, grapheme, alumina, particles of gold and so on. When the material having the higher coefficient of thermal conductivity is mixed in the heat transport medium, a coefficient of thermal conductivity for the heat transport medium is increased. Therefore, when the heat transport medium passes through the container 25, heat exchange is effectively done between the heat transport medium and the magnetocaloric effect material 26. The heat transport medium can be thereby cooled down or heated up within a short time period.

As a result, in a case that it is not necessary to further cool down or heat up the heat transport medium (when compared with a case in which the magnetic heat pump system 30 is operated with the heat transport medium, in which the material having the higher coefficient of thermal conductivity is not mixed), flow speed of the heat transport medium passing through the container 25 can be increased. Therefore, a start-up time period can be made shorter for a cooling function or a heating function of the air conditioning apparatus 10 in a low temperature condition. On the other hand, in a case that the flow speed of the heat transport medium passing through the container 25 is maintained at a constant value, temperature decrease or temperature increase of the heat transport medium having passed through the container 25 becomes larger. Therefore, a cooling capacity or a heating capacity of the air conditioning apparatus 10 can be increased.

Figure 4A:
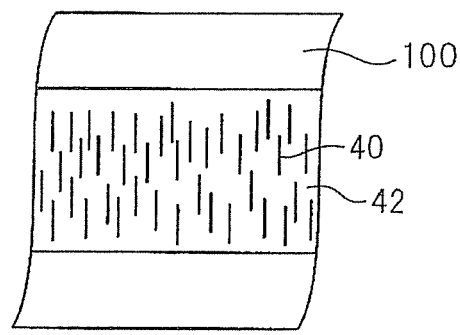
FIG. 4A is a view showing a condition of heat transport medium, in which a coefficient of thermal conductivity is high.
Figure 4B:
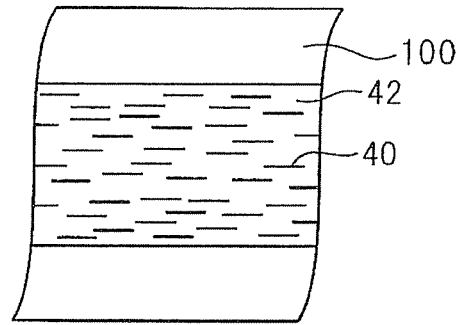
FIG. 4B is a view showing a condition of the heat transport medium, in which a coefficient of thermal conductivity is low.

Explanation will be further made for such a case, in which the material having the higher coefficient of thermal conductivity than that of the heat transport medium (for example, carbon nano-tube) is mixed in the heat transport medium. As shown in FIG. 4A, in a case that the carbon nano-tubes 40 are mixed in heat transport medium 42 contained in a space formed between a pair of flat plates 100 (which are made of, for example, magnetocaloric effect material) and both ends thereof are oriented in the same direction toward the flat plates 100, the coefficient of the thermal conductivity is increased. On the other hand, as shown in FIG. 4B, in a case that the both ends of the carbon nano-tubes 40 are oriented in the same direction in parallel to the flat plates 100, the coefficient of the thermal conductivity is not increased. In addition, when the carbon nano-tubes 40 clump together, the coefficient of the thermal conductivity is not increased, either. Even in a case that the other material than the carbon nano-tubes 40, which has higher coefficient of the thermal conductivity than that of the heat transport medium, are mixed in the heat transport medium, the coefficient of the thermal conductivity is not increased, either, when such material clump together.

Figure 4C:
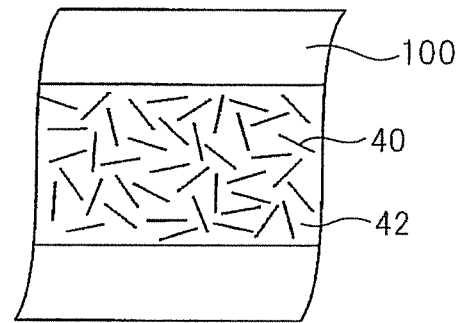
FIG. 4C is a view showing a condition, in which the heat transport medium is agitated.

Therefore, as shown in FIG. 4C, it is important to prevent the carbon nano-tubes 40 from clumping together and not to orient the carbon nano-tubes 40 in the same direction, when the carbon nano-tubes 40 mixed in the heat transport medium 42 pass through the space between the flat plates 100. As shown in FIG. 4C, when the carbon nano-tubes 40 do not clump together and are not oriented in the same direction, the coefficient of the thermal conductivity of the heat transport medium 42 is not decreased.

Figure 4D:
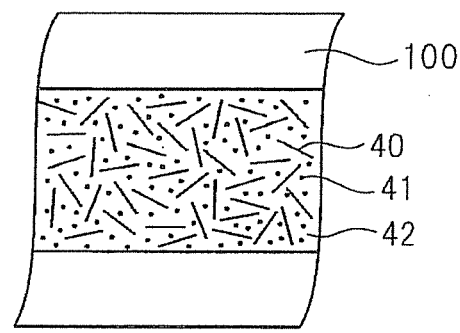
FIG. 4D is a view showing a condition, in which minute magnetic material is mixed in the heat transport medium and such heat transport medium is agitated.

One of the methods for preventing the carbon nano-tubes 40 (which are mixed in the heat transport medium 42) from clumping together and for orienting the carbon nano-tubes 40 in different directions, is that minute magnetic material 41 is mixed in the heat transport medium 42 together with the carbon nano-tubes 40, as shown in FIG. 4D. Alternatively, the minute magnetic material (for example, iron component) may be blended to the carbon nano-tubes 40.

The minute magnetic material 41 or the carbon nano-tubes 40 (to which the magnetic material 41 are blended) are moved depending on a change of the magnetic field applied to the container 25, when the heat transport medium 42 passes through the space between the plates 100 (corresponding to the inside space of the container 25). Since the carbon nano-tubes 40 are moved, the directions of the carbon nano-tubes 40 are oriented in different directions in the heat transport medium 42. Therefore, the coefficient of the thermal conductivity for the heat transport medium 42 is not decreased, when the heat transport medium 42 passes through the space between the plates 100 (the space in the container 25).

Second Embodiment

Another one of the methods for preventing the carbon nano-tubes 40 mixed in the heat transport medium 42 from clumping together and for orienting the carbon nano-tubes 40 in different directions, is to forcibly mix round the heat transport medium in the container 25. A second embodiment of the present disclosure will be explained with reference to FIGS. 5A to 5C and FIGS. 6A to 6F.

Agitating structures 50 are shown FIGS. 5A to 5C and FIGS. 6A to 6F.

Figure 5A:
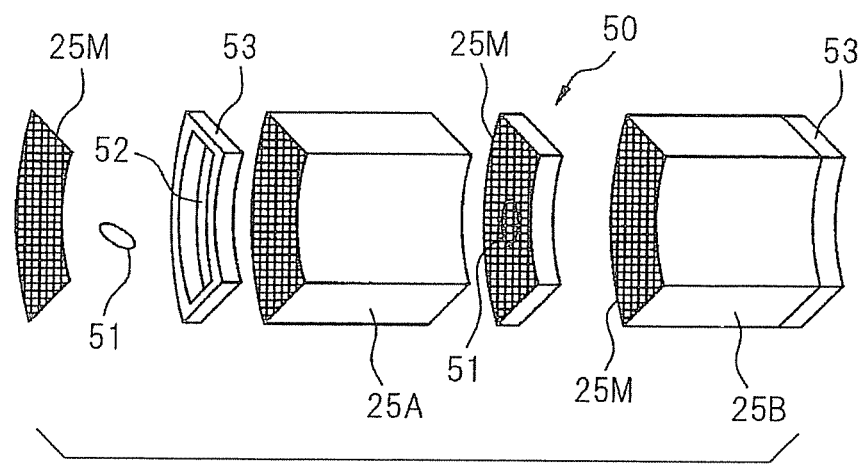
FIG. 5A is a schematic perspective and exploded view showing an agitating unit for the container according to a second embodiment of the present disclosure.

As shown in FIG. 5A, multiple stirring bars 51 are provided in each container 25, wherein the stirring bars 51 are rotated in accordance with the change of the magnetic field. More in detail, the container 25 is divided into a first container portion 25A and a second container portion 25B, and three stirring bars 51 are provided at each axial end of the first and second container portions 25A and 25B. Multiple frame members 53, each of which has a cross section identical to that of the first and second container portions 25A and 25B, are attached at both axial ends of the first and second container portions 25A and 25B. Each of the stirring bars 51 is accommodated in each rotating space 52 formed in an inside of the frame member 53, so that the stirring bar 51 is rotatable in the rotating space 52. Meshed end plates 25M, which are the same to the meshed end plates 25M of FIG. 3B, are attached to the outer axial ends of the respective frame members 53. The meshed endplates 25M are not always necessary.

Figure 5B:
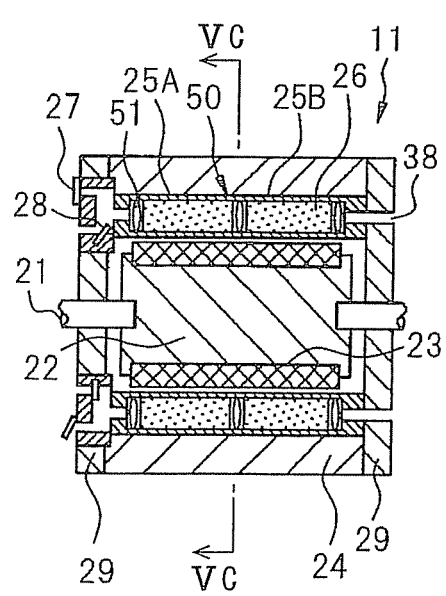
FIG. 5B is a schematic cross sectional view showing a magnetic heat pump device, in which the agitating unit of FIG. 5A is incorporated.
Figure 5C:
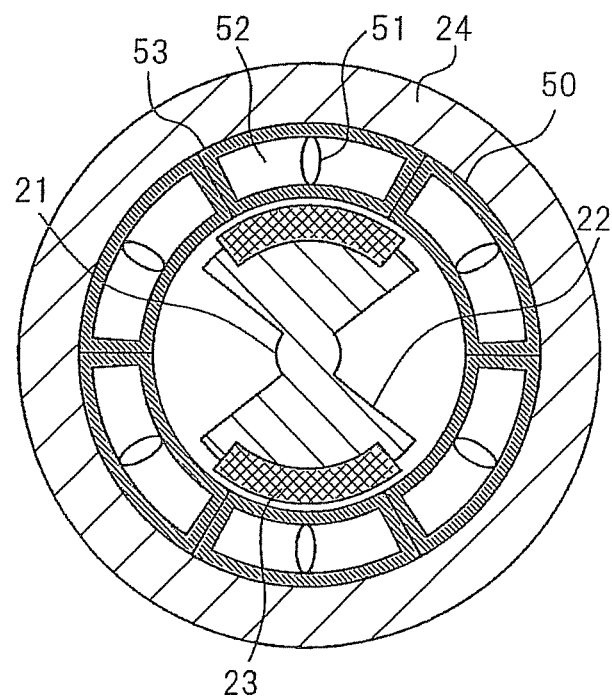
FIG. 5C is a schematic cross sectional view taken along a line VC-VC in FIG. 5B.

FIG. 5B shows a cross sectional view of the cold water generating portion 11, in which another agitating structure 50 (similar to the structure 50 of FIG. 5A) is incorporated, when the swash-plate type compressor is used as the reciprocating pump 13. FIG. 5C is an enlarged cross sectional view taken along a line VC-VC in FIG. 5B. As explained above, the stirring bars 51 are rotatable in the respective rotating spaces 52 of the frame members 53.

An operation for the rotation of the stirring bars 51 will be explained with reference to FIGS. 6A to 6F. Each of the stirring bars 51 is magnetized, so that it has N-pole and S-pole.

An operation is explained for the stirring bar 51A, which is shown in a left-most location in each of the drawings of FIGS. 6A to 6F. When the rotor 22 is in a position shown in FIG. 6A, that is, when the pair of magnets 23 is positioned in a horizontal direction, the N-pole of the magnet 23 (a left-hand side magnet 23 in the drawing, which is referred to as a first magnet) straightly faces to the stirring bar 51A. In this position, the S-pole of the stirring bar 51 and the N-pole of the first magnet 23 attract to each other and the stirring bar 51 is oriented in the horizontal direction.

Figure 6A:
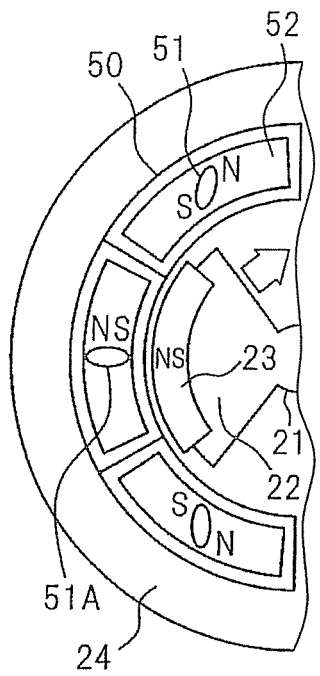
FIGS. 6A, 6B, 6C, 6D, 6E and 6F are schematic views, each of which shows a condition of the rotor in its respective rotating position for explaining a rotating operation of a stirring bar.
Figure 6B:
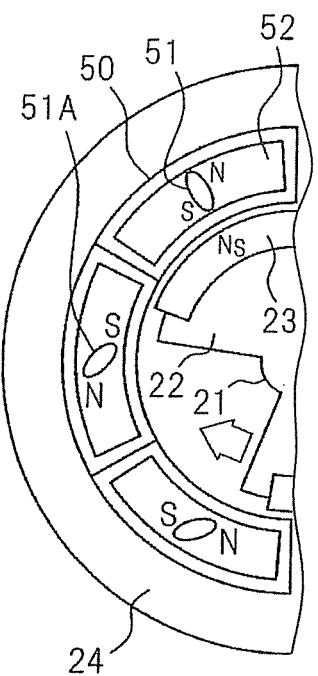

FIG. 6B shows another position of the rotor 22, wherein the rotor 22 is rotated by 60 degrees in a clockwise direction from the position of FIG. 6A. In this position, the N-pole of the first magnet 23 is separated from the stirring bar 51A in a right-upper direction. The S-pole of the stirring bar 51A follows the rotation of the rotor 22 and is rotated in an anti-clockwise direction so that the S-pole of the stirring bar 51A is directed toward the N-pole of the first magnet 23.

Figure 6C:
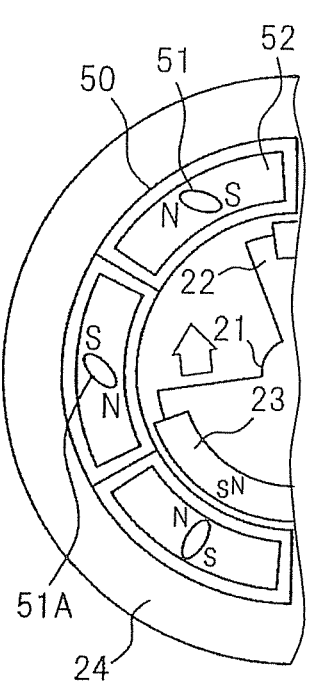

FIG. 6C shows a further position of the rotor 22, wherein the rotor 22 is further rotated by 60 degrees in the clockwise direction from the position of FIG. 6B. In this position, the N-pole of the first magnet 23 is further separated from the stirring bar 51A, while S-pole of a second magnet 23 comes closer to the stirring bar 51A from a lower side. Then, the N-pole of the stirring bar 51A is attracted by the S-pole of the second magnet 23, so that the N-pole of the stirring bar 51A is further rotated in the anti-clockwise direction. The N-pole of the stirring bar 51A is directed toward the S-pole of the second magnet 23.

Figure 6D:
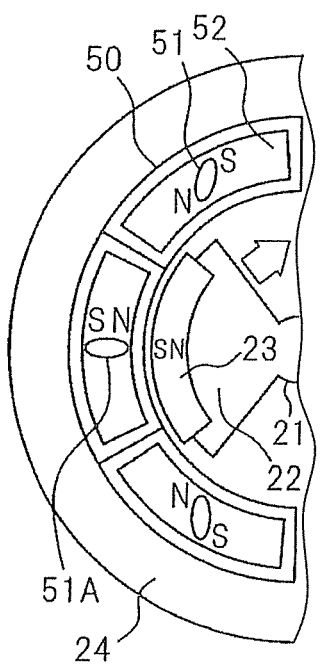

FIG. 6D shows a further position of the rotor 22, wherein the rotor 22 is rotated by 60 degrees in the clockwise direction from the position of FIG. 6C. In this position, the pair of magnets 23 is positioned in the horizontal direction and the S-pole of the second magnet 23 straightly faces to the stirring bar 51A. In this position, the N-pole of the stirring bar 51 and the S-pole of the second magnet 23 attract to each other and the stirring bar 51 is oriented in the horizontal direction.

Figure 6E:
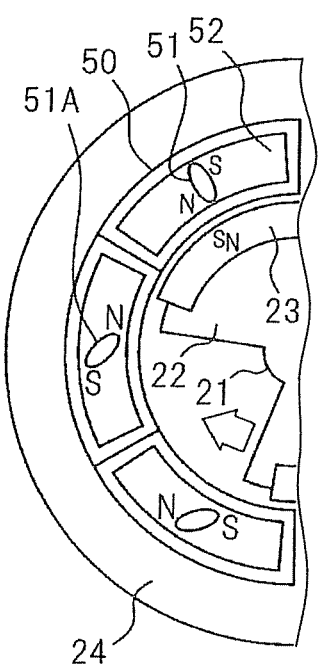

FIG. 6E shows a further position of the rotor 22, wherein the rotor 22 is rotated by 60 degrees in the clockwise direction from the position of FIG. 6D. In this position, the S-pole of the second magnet 23 is separated from the stirring bar 51A in the right-upper direction. The N-pole of the stirring bar 51A follows the rotation of the rotor 22 and is rotated in the anti-clockwise direction so that the N-pole of the stirring bar 51A is directed toward the S-pole of the second magnet 23.

Figure 6F:
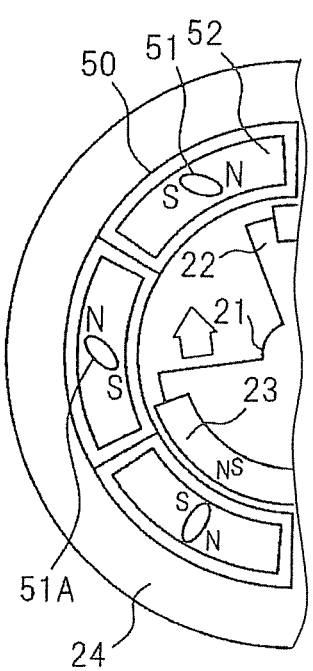

FIG. 6F shows a further position of the rotor 22, wherein the rotor 22 is rotated by 60 degrees in the clockwise direction from the position of FIG. 6E. In this position, the S-pole of the second magnet 23 is further separated from the stirring bar 51A, while the N-pole of the first magnet 23 comes closer to the stirring bar 51A from the lower side. Then, the S-pole of the stirring bar 51A is attracted by the N-pole of the first magnet 23, so that the S-pole of the stirring bar 51A is further rotated in the anti-clockwise direction. The S-pole of the stirring bar 51A is directed toward the N-pole of the first magnet 23. When the rotor 22 is further rotated by 60 degrees in the clockwise direction from the position of FIG. 6F, the rotor 22 is returned to its initial position of FIG. 6A.

As above, the stirring bar 51A follows the rotation of the rotor 22 so as to rotate by itself. When the rotor 22 is rotated in the clockwise direction by one revolution, the stirring bar 51A is rotated in the anti-clockwise direction by 360 degrees. Since the stirring bars 51 are rotated depending on the rotation of the rotor 22, the heat transport medium is agitated by the stirring bars 51 and then flows into the first and second container portions 25A and 25B.

According to the above second method, the carbon nano-tubes 40 mixed in the heat transport medium 42 are forcibly mixed round in the container 25, so that the carbon nano-tubes 40 are prevented from clumping together and they are oriented in different directions. The second method can be also applied to a case, in which the other material than the carbon nano-tubes, which has a higher coefficient of thermal conductivity than that of the heat transport medium, is mixed in the heat transport medium.

Third Embodiment

Figure 7:
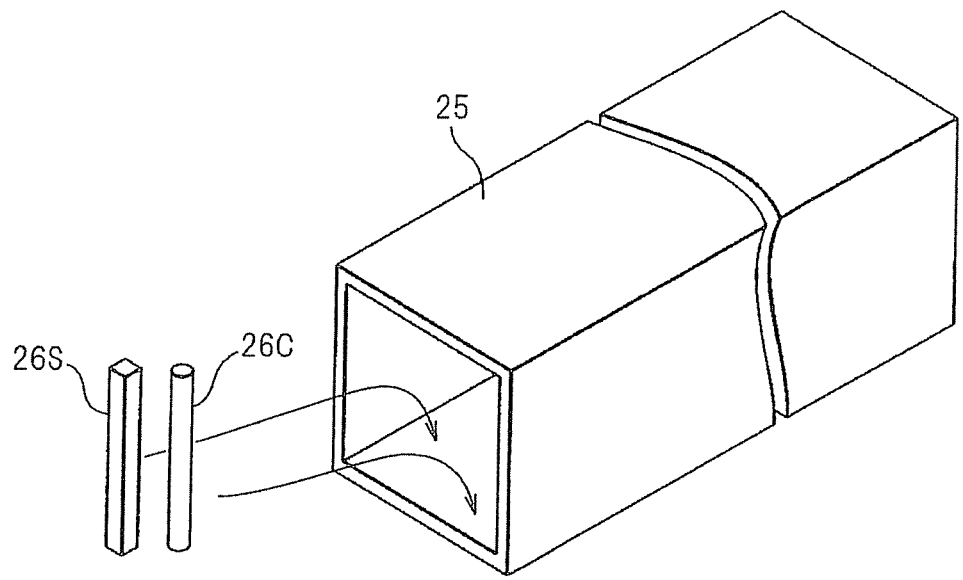
FIG. 7 is a schematic view showing an agitating unit (an agitating structure) according to a third embodiment of the present disclosure for explaining a structure of the agitating unit.

FIG. 7 shows another agitating structure for the container 25 of the magnetic heat pump device 30A according to a third embodiment of the present disclosure.

For the purpose of simplifying the explanation, a shape of the container 25 is shown as a rectangular form. However, the shape of the container 25 may be so formed as to be in the shape of the first and second embodiments. According to the third embodiment, the magnetocaloric effect material is formed in a circular column shape 26C or in a rectangular column shape 26S and such magnetocaloric effect material 26C and/or 26S are arranged in the container 25, instead of the pellet type magnetocaloric effect material, so as to more effectively agitate the heat transport medium passing through the container 25.

Figure 8A:
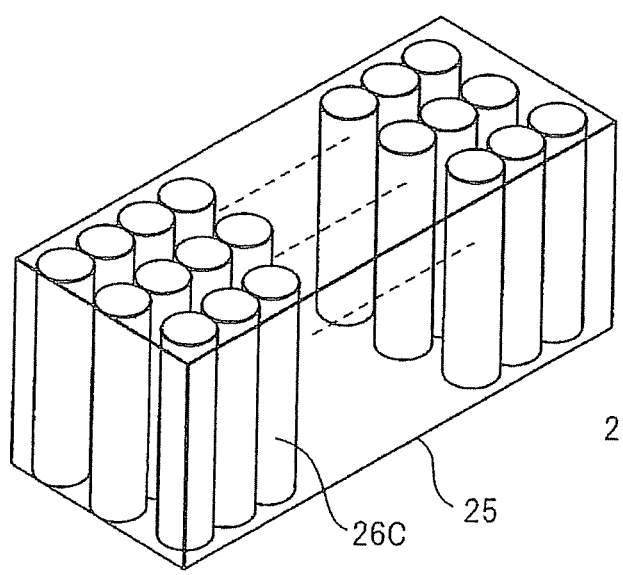
FIG. 8A is a schematic perspective view of the agitating unit (the agitating structure)
Figure 8B:
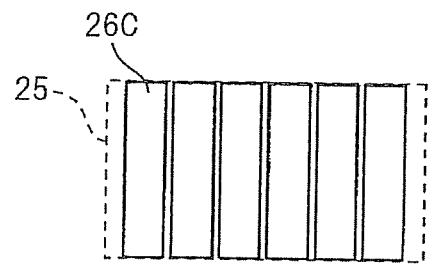
FIG. 8B is a schematic front view of the agitating unit.
Figure 8C:
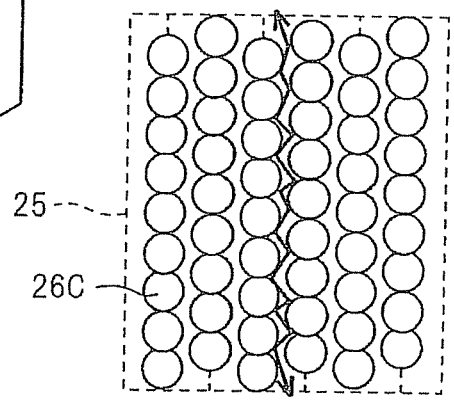
FIG. 8C is a schematic view showing movement of the heat transport medium passing through the container.

FIGS. 8A to 8C show detailed structure of the agitating structure for the container 25 according to the third embodiment. As shown in FIG. 8A, multiple circular columns 26C of the magnetocaloric effect material are arranged in multiple straight lines from one opening end toward the other opening end of the container 25. According to such a structure, the heat transport medium (which has been sucked into or which will be discharged from the container 25) flows in a zigzag form, as indicated by a solid line in FIG. 8C, in the space between the circular columns 26C of the magnetocaloric effect material arranged in the straight lines. As a result, the heat transport medium is agitated in the container 25.

(First Modification)

Figure 9A:
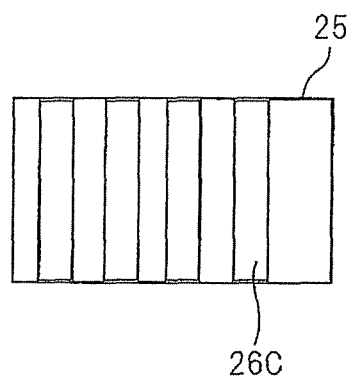
FIG. 9A is a schematic front view showing a container according to a first modification of the third embodiment.
Figure 9C:
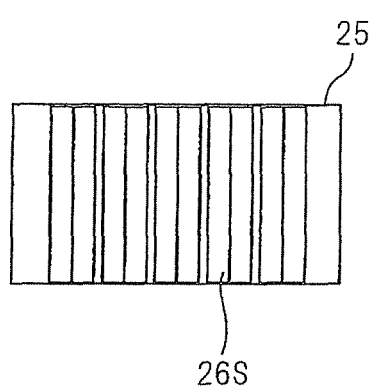
FIG. 9C is a schematic front view showing a container according to a second modification of the third embodiment.
Figure 9B:
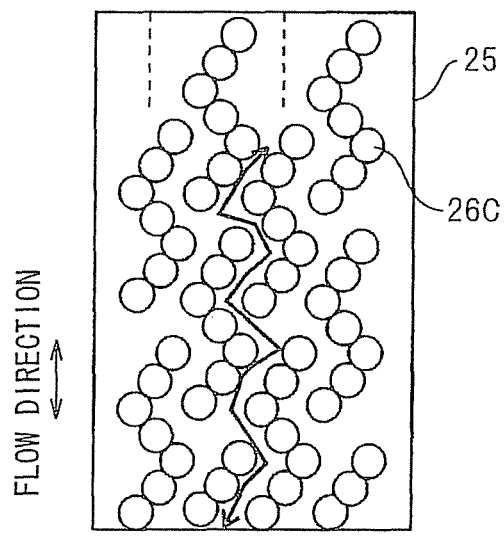
FIG. 9B is a schematic view showing movement of the heat transport medium passing through the container of FIG. 9A.

FIGS. 9A and 9B show an agitating structure of the container 25 according to a first modification of the third embodiment. According to the present modification, multiple circular columns 26C of the magnetocaloric effect material are arranged in the container 25 from one opening end toward the other opening end, wherein a certain number of circular columns 26C forms one group and multiple groups of the circular columns 26C are located in a zigzag form. According to such a structure, the heat transport medium (which has been sucked into or which will be discharged from the container 25) flows in a larger zigzag form, as indicated by a solid line, in the spaces between the groups of the circular columns 26C of the magnetocaloric effect material arranged in the zigzag form. As a result, the heat transport medium is agitated in the container 25.

(Second Modification)

Figure 9D:
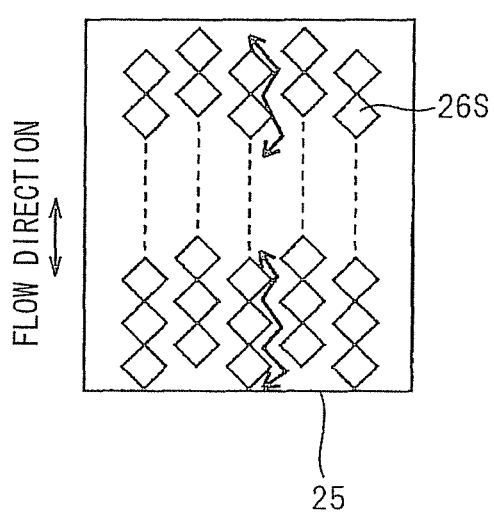
FIG. 9D is a schematic view showing movement of the heat transport medium passing through the container of FIG. 9C.

FIGS. 9C and 9D show an agitating structure of the container 25 according to a second modification of the third embodiment. According to the present modification, multiple rectangular columns 26S of the magnetocaloric effect material are arranged in multiple straight lines from one opening end toward the other opening end of the container 25. According to such a structure, the heat transport medium (which has been sucked into or which will be discharged from the container 25) flows in a zigzag form, as indicated by a solid line, in the space between the rectangular columns 26S of the magnetocaloric effect material arranged in the straight lines. As a result, the heat transport medium is agitated in the container 25. The rectangular column has angled corners. Therefore, when the flow of the heat transport medium collides against the rectangular columns 26S, the flow is disturbed more largely than the case of the third embodiment of FIGS. 8A to 8C (the circular columns). As a result, the heat transport medium flows in the zigzag form, which is larger than that of the third embodiment of FIGS. 8A to 8C.

(Third Modification)

Figure 10A:
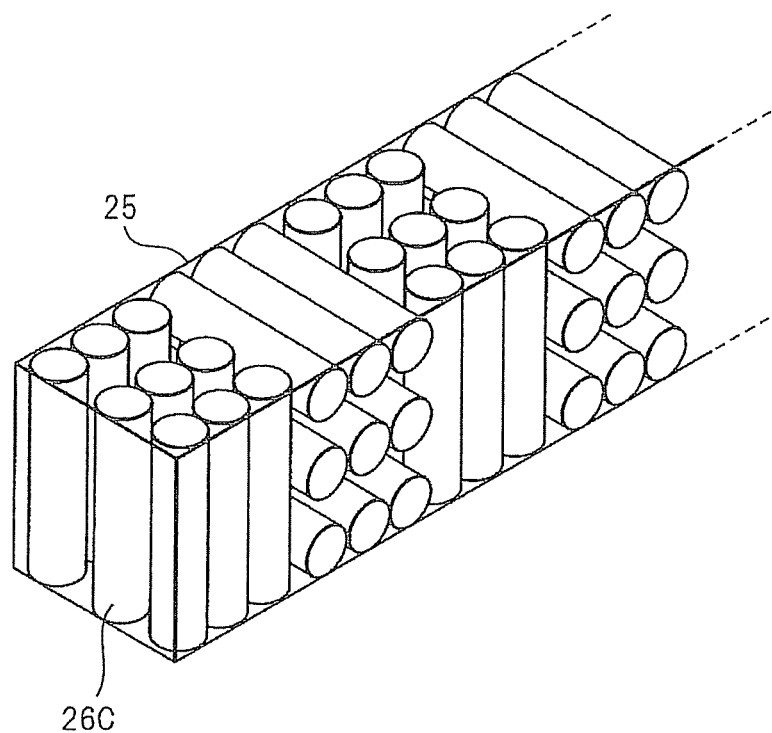
FIG. 10A is a schematic perspective view showing a container according to a third modification of the third embodiment.

FIG. 10A shows an agitating structure of the container 25 according to a third modification of the third embodiment. According to the third modification, multiple circular columns 26C of the magnetocaloric effect material (three columns in the drawing) are arranged in multiple straight lines (three lines in the drawing) from one opening end toward the other opening end of the container 25. Those circular columns 26C (nine columns) belong to a first column group, in which each of the circular columns 26C extends in a vertical direction. A second column group (other nine circular columns 26C) is arranged in the container 25 at a downstream side of the first column group in a similar manner to the first column group, wherein however each of the circular columns 26C extends in a horizontal direction. The first and second column groups are alternately arranged in the container 25 at a downstream side of a first set of the first and second column groups.

According to the above third embodiment (FIGS. 8A to 8C) or the first and second modifications (FIGS. 9A to 9D), the heat transport medium (which has been sucked into or which will be discharged from the container 25) flows in the zigzag form only in the horizontal direction, in the space between the columns 26C or 26S of the magnetocaloric effect material. According to the third modification, however, the heat transport medium flows at first in the zigzag form in the horizontal direction and then in the zigzag form in the vertical direction. As a result, the heat transport medium is more strongly agitated in the container 25.

(Fourth Modification)

Figure 10B:
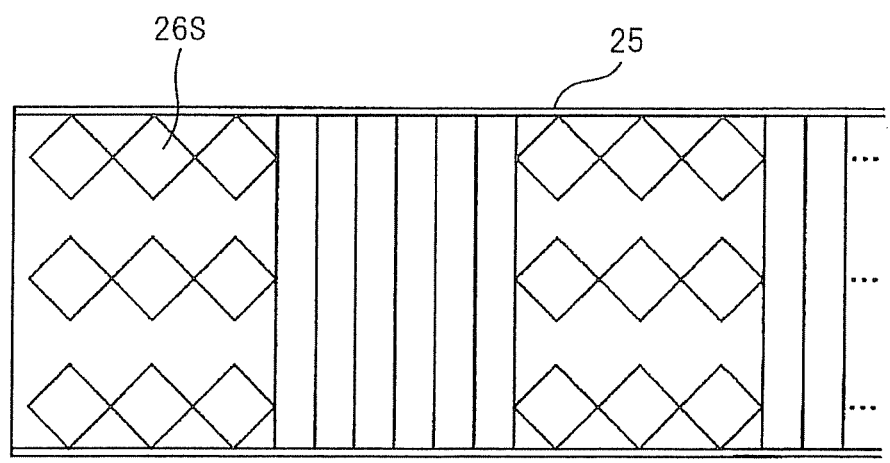
FIG. 10B is a schematic top plan view showing a container according to a fourth modification of the third embodiment.

FIG. 10B shows an agitating structure of the container 25 according to a fourth modification of the third embodiment. As shown in FIG. 10B, the circular columns 26C of FIG. 10A are replaced by the rectangular columns 26S in this modification. As in the same manner to the third modification (FIG. 10A), the heat transport medium likewise flows at first in the zigzag form in the horizontal direction and then in the zigzag form in the vertical direction. In addition, since the rectangular columns 26S are used instead of the circular columns 26C, the heat transport medium is furthermore strongly agitated in the container 25.

The arrangements of the circular columns 26C and/or the rectangular columns 26S of the magnetocaloric effect material should not be limited to the above third embodiment (including the first to the fourth modifications). The flow of the heat transport medium may be rotated in the container according to a certain arrangement of the circular and/or rectangular columns.

According to the above embodiments, the material 40 having the higher coefficient of the thermal conductivity than that of the heat transport medium 42 is mixed in the heat transport medium 42, in order to increase the coefficient thermal conductivity of the heat transport medium, in other words, in order to improve heat exchange between the heat transport medium and the magnetocaloric effect material 26.

Instead of the material 40 having the higher coefficient of the thermal conductivity than that of the heat transport medium 42, such material as having a specific heat or a volume specific heat, which is higher than that of the heat transport medium, may be mixed in the heat transport medium, so that heat exchange between the heat transport medium and the magnetocaloric effect material may be improved.

Latent-heat storage material may be used as the material, which has the higher specific heat or the higher volume specific heat than that of the heat transport medium. For example, paraffin, erythritol, threitol, naphthaline, polyethylene, stearic acid and so on may be used as the latent-heat storage material. When the latent-heat storage material is mixed in the heat transport medium, it may clump together in a similar manner to the carbon nano-tubes. Therefore, the heat transport medium may be preferably agitated when the latent-heat storage material is mixed in the heat transport medium in order to increase the coefficient of the thermal conductivity.

What is claimed is:

1. A magnetic heat pump system comprising:
a magnetic heat pump device;
a heat radiating device radiating heat of a heat transport medium, which is discharged from one end of the magnetic heat pump device, to an outside of the heat radiating device; and
a heat absorbing device absorbing heat from an outside of the heat absorbing device into the heat transport medium discharged from the other end of the magnetic heat pump device,
wherein the magnetic heat pump device comprises;
a rotational shaft;
a rotor fixed to the rotational shaft and having a permanent magnet at an outer periphery of the rotor;
a cylindrical yoke coaxially arranged with the rotational shaft;
a container, which is arranged at an inner periphery of the cylindrical yoke and in which a magnetocaloric effect material is accommodated and through which the heat transport medium passes;
a magnetic field changing unit including the rotor and the permanent magnet and changing a degree of magnetic field to be generated by the permanent magnet and to be applied to the magnetocaloric effect material;
a working fluid moving unit moving the heat transport medium in a reciprocating manner in the container in an axial direction of the rotational shaft, so that the heat transport medium is sucked into the container through one end of the container and the heat transport medium is discharged from the container through the other end of the container and vice versa;
wherein a material having a specific heat or a volume specific heat, which is higher than that of the heat transport medium is mixed in the heat transport medium;
wherein a minute magnetic material is further mixed in the heat transport medium; and
wherein an agitating structure is driven by a magnetic field change induced by the magnetic field changing unit, the agitating structure is formed in the container, the agitating structure has a stirring bar rotated by the magnetic field change on a plane perpendicular to the axial direction of the rotational shaft, and the agitating structure agitating the heat transport medium by a rotation of the stirring bar.

2. The magnetic heat pump system according to claim 1, wherein
the material having the specific heat or the volume specific heat, which is higher than that of the heat transport medium, is composed of a latent-heat storage material.

3. The magnetic heat pump system according to claim 2, wherein the latent-heat storage material is selected from one of the following materials; paraffin, erythritol, threitol, naphthaline, polyethylene, and stearic acid.

4. A magnetic heat pump system comprising:
a magnetic heat pump device;
a heat radiating device radiating heat of a heat transport medium, which is discharged from one end of the magnetic heat pump device, to an outside of the heat radiating device; and
a heat absorbing device absorbing heat from an outside of the heat absorbing device into the heat transport medium discharged from the other end of the magnetic heat pump device,
wherein the magnetic heat pump device comprises;
a rotational shaft;
a rotor fixed to the rotational shaft and having a permanent magnet at an outer periphery of the rotor;
a cylindrical yoke coaxially arranged with the rotational shaft;
a container, which is arranged at an inner periphery of the cylindrical yoke and in which a magnetocaloric effect material is accommodated and through which the heat transport medium passes;
a magnetic field changing unit including the rotor and the permanent magnet and changing a degree of magnetic field to be generated by the permanent magnet and to be applied to the magnetocaloric effect material;
a working fluid moving unit moving the heat transport medium in a reciprocating manner in the container in an axial direction of the rotational axis, so that the heat transport medium is sucked into the container through one end of the container and the heat transport medium is discharged from the container through the other end of the container and vice versa;
wherein one of the following first and second materials is mixed in the heat transport medium;
a first material having a coefficient of thermal conductivity, which is higher than that of the heat transport medium, and
a second material having a specific heat or a volume specific heat, which is higher than that of the heat transport medium,
wherein an agitating structure, which is driven by a magnetic field change induced by the magnetic field changing unit, the agitating structure is formed in the container, the agitating structure has a stirring bar rotated by the magnetic field change on a plane perpendicular to the axial direction of the rotational shaft, and the agitating structure agitating the heat transport medium by a rotation of the stirring bar.

5. The magnetic heat pump system according to claim 4, wherein
   a minute magnetic material is further mixed in the heat transport medium.

6. The magnetic heat pump system according to claim 1, wherein the rotor rotates in a clockwise direction and the stirring bar rotates in a counter clockwise direction.

7. The magnetic heat pump system according to claim 1, wherein when the rotor rotates in a clockwise direction one complete revolution, the stirring bar rotates in a counter clockwise direction 360 degrees.

8. The magnetic heat pump system according to claim 4, wherein the rotor rotates in a clockwise direction and the stirring bar rotates in a counter clockwise direction.

9. The magnetic heat pump system according to claim 4, wherein when the rotor rotates in a clockwise direction one complete revolution, the stirring bar rotates in a counter clockwise direction 360 degrees.

* * * * *